US012173888B2

(12) United States Patent
Creeley

(10) Patent No.: US 12,173,888 B2
(45) Date of Patent: *Dec. 24, 2024

(54) ILLUMINATING DRYWALL SPONGE DEVICE

(71) Applicant: Creeley Patent LLC, Cheektowaga, NY (US)

(72) Inventor: Jacob Creeley, Orchard Park, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/814,039

(22) Filed: Jul. 21, 2022

(65) Prior Publication Data

US 2022/0364719 A1 Nov. 17, 2022

Related U.S. Application Data

(63) Continuation of application No. 16/728,845, filed on Dec. 27, 2019, now Pat. No. 11,448,391.

(51) Int. Cl.

*F21V 33/00* (2006.01)
*B24B 55/00* (2006.01)
*F21V 23/04* (2006.01)

(52) U.S. Cl.

CPC .......... *F21V 33/0084* (2013.01); *B24B 55/00* (2013.01); *F21V 23/04* (2013.01)

(58) Field of Classification Search

CPC ...... F21V 33/0084; B43K 29/10; B24B 55/00
See application file for complete search history.

(56) References Cited

U.S. PATENT DOCUMENTS 2,866,991 A 1/1959 Chao
3,021,649 A 2/1962 Robbins
4,361,934 A 12/1982 Darnell
4,592,148 A 6/1986 Longenette
4,714,644 A 12/1987 Rich
(Continued)

FOREIGN PATENT DOCUMENTS

EP 2653635 A2 * 10/2013 .............. E04F 21/00

OTHER PUBLICATIONS

Machine translation of Noel, D, EP-2653635-A2, published Oct. 23, 2013 (Year: 2013).*

(Continued)

*Primary Examiner* — William N Harris
(74) *Attorney, Agent, or Firm* — Mertzlufft Law PLLC; Joshua Mertzlufft

(57) ABSTRACT

An illuminating drywall sponge device provides a drywall sanding/scraping tool having tapered cavities that securely retain an illumination mechanism, such that the work surface being sanded is illuminated during sanding operations; and a marking mechanism for marking the illuminated work surface. The sponge light device provides a housing through which the sanding function is primarily performed. The housing has a block or rectangular shape, and walls with an abrasive material. The housing also has multiple tapered cavities formed at the walls of the housing, oriented coplanar with the surface being sanded. An illumination mechanism fits into the cavity. The illumination mechanism orients in the cavity to throw light outwardly from the edge of the housing. A grommet fits into the outer region of the cavities to help stabilize and fasten the illumination mechanism in the cavities. A retractable marking mechanism may also insert into the cavity.

20 Claims, 14 Drawing Sheets

(56) References Cited

U.S. PATENT DOCUMENTS

| | | | | |
|---|---|---|---|---|
| 4,965,966 | A | 10/1990 | Braasch | |
| 5,368,424 | A | 11/1994 | Bettenhausen | |
| 5,489,233 | A | 2/1996 | Cook | |
| 5,527,212 | A | 6/1996 | Bowen | |
| 6,454,428 | B1 * | 9/2002 | Bruzon | B25G 1/04 362/120 |
| 6,544,113 | B1 | 4/2003 | Wheeler | |
| D480,619 | S | 10/2003 | Koenig, Jr. | |
| 6,662,521 | B1 | 12/2003 | Escobedo | |
| D501,857 | S | 2/2005 | Ebisawa | |
| 6,896,606 | B1 | 5/2005 | Turgeon | |
| 7,169,029 | B2 | 1/2007 | Petersen | |
| 7,320,634 | B1 | 1/2008 | Minick | |
| 7,364,501 | B2 | 4/2008 | Ali | |
| D625,063 | S | 10/2010 | Armaly, Jr. | |
| 7,901,275 | B2 | 3/2011 | Brogden | |
| 7,914,167 | B2 | 3/2011 | Petersen | |
| 10,420,449 | B2 | 9/2019 | Park | |
| 10,448,799 | B2 | 10/2019 | Klimis | |
| D902,000 | S | 11/2020 | Coughenour, Jr. | |
| 10,875,154 | B2 | 12/2020 | Dow | |
| D913,071 | S | 3/2021 | Stasko | |
| D926,001 | S | 7/2021 | Jacques | |
| 11,154,959 | B2 | 10/2021 | Lehuu | |
| 2002/0131267 | A1 * | 9/2002 | Van Osenbruggen | B23Q 17/2404 362/109 |
| 2003/0224708 | A1 | 12/2003 | Koenig | |
| 2004/0259488 | A1 | 12/2004 | McArthur | |
| 2007/0099551 | A1 | 5/2007 | Walsh | |
| 2007/0139916 | A1 | 6/2007 | Vermillion | |
| 2007/0298698 | A1 | 12/2007 | Ali | |
| 2008/0311831 | A1 | 12/2008 | Milbourne | |
| 2008/0311832 | A1 * | 12/2008 | King | B24B 23/00 451/356 |
| 2008/0311833 | A1 * | 12/2008 | King | B24B 49/16 451/356 |
| 2009/0065538 | A1 | 3/2009 | Rodriquez | |
| 2015/0055363 | A1 | 2/2015 | Van Straten | |
| 2016/0010849 | A1 | 1/2016 | Snellenberger | |
| 2016/0271458 | A1 | 9/2016 | Lin | |
| 2017/0066105 | A1 | 3/2017 | Grayden | |
| 2019/0210193 | A1 | 7/2019 | Belanger | |

OTHER PUBLICATIONS

Uneeda, Uneeda Sponge (accessed May 16, 2022), https://www.zoro.com/uneeda-ekasilk-plus-12-in-sponge-3-x-4-x-4-hv-fine-p-105601/i/G100420255/.

Harbor Freight, Warrior Aluminum Oxide Sanding Sponges—Fine Grade, 10 Pack (Accessed Jul. 13, 2023), https://www.harborfreight.com/aluminum-oxide-sanding-sponges-fine-grade-10-pack-63912.html.

* cited by examiner

ILLUMINATING DRYWALL SPONGE DEVICE

CROSS REFERENCE TO RELATED APPLICATIONS

This application is a continuation application of U.S. application Ser. No. 16/728,845, filed on 27 Dec. 2019, the entire disclosure of which is hereby incorporated by reference.

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a sander is a specific type of manual or power tool used to smooth a work surface, such as a drywall, wooden surface, or flooring, including woods and plastics. Sanders are also used to remove small amounts of material from the work surface. Often, sanders use sandpaper or the like to smooth surfaces by abrasion. It is necessary to apply a pressing force onto the work surface during sanding. However, without proper lighting, it is possible to bias the sander or sanding paper too heavily in one area as opposed to others, creating a displeasing finish and surface irregularities. It is often advantageous to mark the work surface if a pencil or chalk is easily available.

Other proposals have involved sanding tools and flashlights. The problem with these sanding systems is that they do not combine a lighting means with the sander. Also, they do not include an integrated marker in the sander. Even though the above cited sanding devices meets some of the needs of the market, an illuminating drywall sponge device that provides a unique drywall sanding/scraping tool that is structured with tapered cavities for securely retaining an illumination mechanism, so that the work surface being sanded is simultaneously illuminated during sanding operations; and a marking mechanism for marking the illuminated work surface, is still desired.

SUMMARY

Illustrative embodiments of the disclosure are generally directed to an illuminating drywall sponge device. The sponge light device that provides a unique drywall sanding/scraping tool that is structured with tapered cavities for securely retaining an illumination mechanism, so that the work surface being sanded is simultaneously illuminated during sanding operations; and a marking mechanism for marking the illuminated work surface. The illumination allows for easy detection of imperfections in the drywall, such as taping, sanding damage caused by other tradesmen, nail holes, and staple holes that inevitably occur during construction. The use of such illumination can be useful for sanding, cleaning, and touching up the surface of the drywall in dark environments, and for more precision drywall work.

In some embodiments, the illuminating drywall sponge device provides a housing through which the sanding function is primarily performed. The housing is defined by a block or rectangular shape, and a substantially solid configuration. The housing may be gritted or may have fastening means to receive and support abrasive paper. In this manner, the housing works to sand a surface through a back-and-forth motion that can be manual or automated with a motor.

In some embodiments, the housing is also defined by multiple tapered cavities formed at the edges of the housing, oriented to be coplanar with the surface being sanded. The cavities are defined by an outer region disposed from the surface of the housing side walls, to an inner region disposed distally from the surface of the side walls. The cavities taper inwardly towards the interior of the housing, with the outer region being wider than the inner region.

In some embodiments, an illumination mechanism fits into the cavity. The tapered configuration of the cavity helps retain the illumination mechanism in the cavity, as the sides of the cavity press into the illumination mechanism, forming a snug fit. The illumination mechanism is oriented in the cavity to throw light outwardly from the edge of the housing. The illumination mechanism may include a light bulb, an LED string, a pressure stimulated light, and other lighting mechanism known in the art.

In some embodiments, a grommet fits into the outer region of the cavities to help stabilize and fasten the illumination mechanism in the cavities. The grommet serves to retain the illumination mechanisms at a desired orientation during sanding, scraping, and cleaning operations. The grommet may be circular-shaped, square-shaped, or other shapes known in the art. In other embodiments, a marking mechanism, such as a stick of chalk, or a pencil, may be inserted into the cavity. The marking mechanism is configured to retract and extend directly from the cavities.

In one non-limiting embodiment, an illuminating drywall sponge device, comprises: a housing defined by a pair of side walls and multiple edge walls, the walls having an outer surface and arranged to form a cuboid shape, the housing further defined by at least one cavity having an outer region and an inner region, the cavity extending into at least one of the walls of the housing, the outer region of the cavity defined by a larger diameter than the inner region of the cavity, the outer region oriented towards the surface of the walls, the inner region oriented away from the surface of the walls; a grommet disposed at the outer region of the cavity; and an illumination mechanism being removably fitted into the cavity, the illumination mechanism having a light end and a free end, the free end being oriented towards the inner region of the cavity, the light end being oriented towards the outer region of the cavity, the light end being removably fitted into the grommet, the light end being operable to selectively emit light, whereby the illumination mechanism emits light outwardly from the walls of the housing.

In another aspect, the housing is defined by a rectangular cuboid shape.

In another aspect, the surface of the walls comprises an abrasive material.

In another aspect, the surface of the walls is encapsulated with a sandpaper.

In another aspect, the multiple edge walls comprise six edge walls.

In another aspect, the side walls have a larger surface area than the edge walls.

In another aspect, the cavity is at least two inches long.

In another aspect, the cavity tapers inwardly from the outer region to the inner region.

In another aspect, the at least one cavity comprises two cavities formed along one of the edge walls.

In another aspect, the grommet is disposed coplanar with the edge walls of the housing at the cavity.

In another aspect, the grommet has a square shape.

In another aspect, the grommet has a circular shape.

In another aspect, the illumination mechanism comprises an elongated light emitting diode.

In another aspect, the illumination mechanism comprises a power switch for powering on and off the light.

In another aspect, the grommet receives the light end of the illumination mechanism in a snug relationship.

In another aspect, the device further comprises a marking mechanism.

In another aspect, the marking mechanism is removably fitted into the cavity, the writing mechanism having a first end and a second end, the second end being oriented towards the inner region of the cavity, the first end being oriented towards the outer region of the cavity, the first end being removably fitted into the grommet, the first end being operable to mark a work surface, whereby the marking mechanism is operable to mark the work surface from the walls of the housing.

In another aspect, the marking mechanism comprises a knob operable to retract and extend the marking mechanism relative to the cavity.

In another aspect, the writing mechanism comprises a stick of chalk.

In another aspect, the writing mechanism comprises a pencil.

One objective of the present invention is to simultaneously sand and illuminate a work surface.

Another objective is to securely retain at least one LED in the edge walls of a sanding sponge.

An exemplary objective is to create critical lighting to identify imperfections by illuminating about ¼" away from all of the working surfaces at all times.

Yet another objective is to integrate a retractable chalk stick or pencil into a sanding sponge.

An exemplary objective is to form a relief cut in the sponge from opposing sides to illuminate the sponge from the front and rear when sanding.

Additional objectives are to shine light at a critical angle, so as to analyze the sanding that has been performed on the work surface.

Additional objectives are to provide either a non-rechargeable or rechargeable battery for powering the illumination mechanism.

Another objective is to utilize the sponge device in myriad industries, including construction, home remodeling, painting, and auto repair industries.

Yet another objective is to provide an inexpensive to manufacture sanding sponge light device.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE FIGURES

The invention will now be described, by way of example, with reference to the accompanying drawings, in which.

Like reference numerals refer to like parts throughout the various views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

An illuminating drywall sponge device 100 is referenced in FIGS. 1-14. Illuminating drywall sponge device 100, hereafter "device 100" is a unique tool used in the art of construction and sanding, and especially sanding of drywall and flooring. Device 100 provides a housing 102 having multiple walls that form a cuboid shape and an abrasive surface effective for sanding of a work surface 106. Housing 102 is defined by at least one cavity 206*a-b*. An illumination mechanism 104*a-b* extends from at least one of the cavities for selective illumination of the work surface 106, as the emitted light shines coplanar to the work surface 106, and thereby elucidates imperfections requiring sanding.

Figure 1:
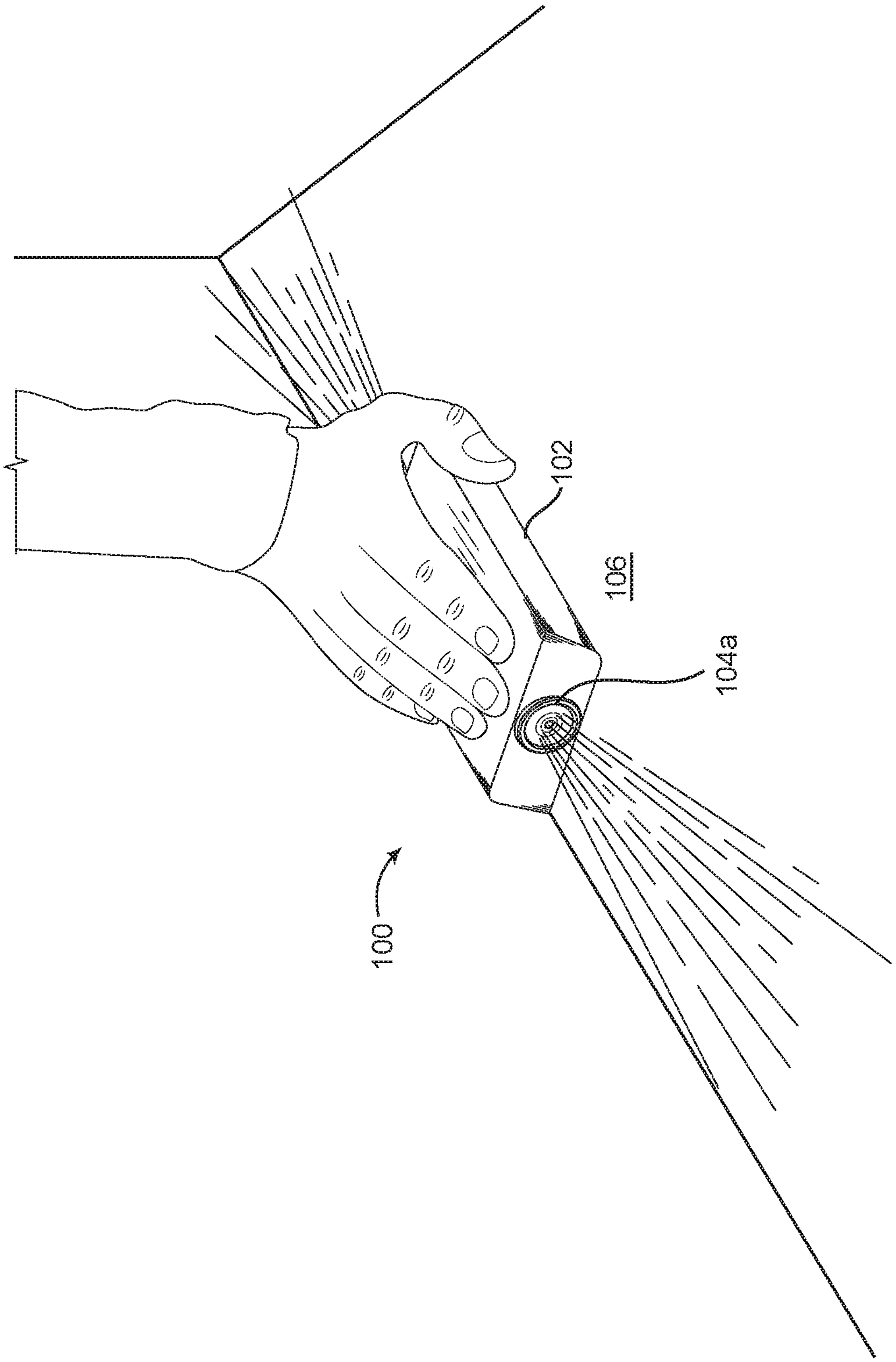
FIG. 1 illustrates a perspective view of an exemplary illuminating drywall sponge device being used in a sanding operation of a work surface, while simultaneously illuminating the work surface, in accordance with an embodiment of the present invention.

For example, FIG. 1 illustrates a perspective view of device 100 being used in a sanding operation of a work surface 106, while simultaneously illuminating the work surface 106. As shown, the light shines coplanar to the work surface 106, and to an orthogonal surface, such as a floor or drywall. This can create a lighting effect in which 180°-270° of the area around the edge wall 202*a*, 202*b* of the housing 102 is illuminated. In other embodiments, the illumination is ¼" away from all of the working surfaces at all times, so as to create critical lighting to identify imperfections. In alternative embodiments, a retractable marking mechanism 900 is fitted into at least one of the cavities for marking the illuminated work surface 106. Other advantages and components are described below.

Figure 2:
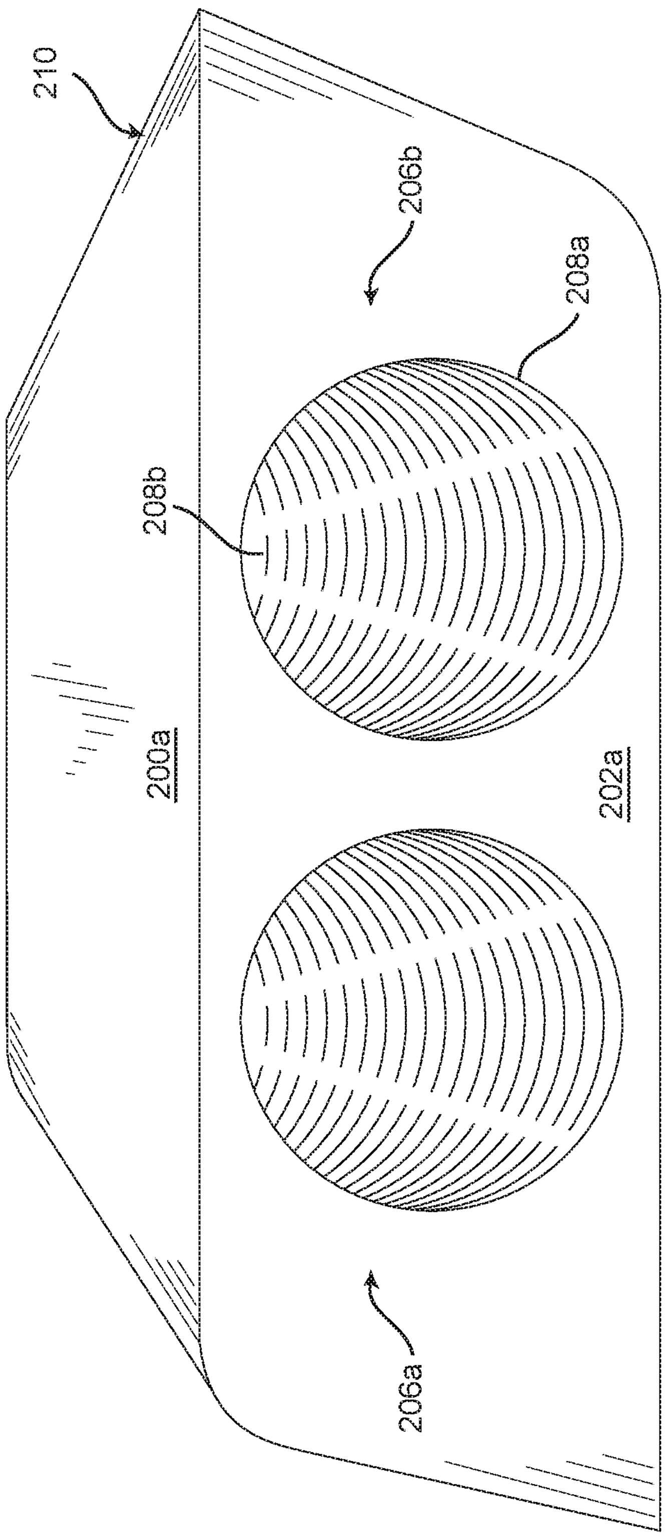
FIG. 2 illustrates a front view of the housing for the illuminating drywall sponge device, showing two tapered cavities formed in the edge walls, in accordance with an embodiment of the present invention.

As referenced in FIG. 2, device 100 comprises a housing 102 defined by a pair of side walls 200*a-b* and multiple edge walls 202*a*, 202*b*, 204*a*, 204*b*. In some embodiments, the walls have an outer surface 210, and are arranged to form a cuboid shape. In one non-limiting embodiment, housing 102 is defined by a rectangular cuboid shape. In one embodiment, multiple edge walls 202*a-b*, 204*a-b* comprise six edge walls 202*a-b*, 204*a-b*—two end edges 202*a*, 202*b* and two lateral edges 204*a*, 204*b*, for example.

However, in other embodiments, the side walls 200*a-b* may be parallel to each other, and exhibit a larger surface area than the edge walls 202*a-b*, 204*a-b*. This forms the rectangular cuboid configuration of the housing 102. In an alternative embodiment, a handle or a contour adapted to receive the hands for enhanced gripping can be included on the side walls or the edge walls. However, in alternative embodiments, housing 102 may be cubical, spherical, pyramidal, and other parallelogram shapes known in the art of sanding tools.

Housing 102 is also sufficiently rigid to support the weight of a hand or robot for sanding functions. Thus, housing 102 is substantially solid and has sufficient weight to enable sanding of the work surface 106. In some embodiments, the surface 210 of the walls 200*a-b*, 202*a-b*, 204*a-b* for the housing 102 comprises an abrasive material. Such an abrasive, or gritted, configuration allows for sanding operations on a work surface 106. However, in other embodiments, the surface of the walls is encapsulated with a sandpaper. A fastener, such as a clip or other sanding paper fastening means may be used to retain sandpaper on surface 210 of walls.

Figure 7:
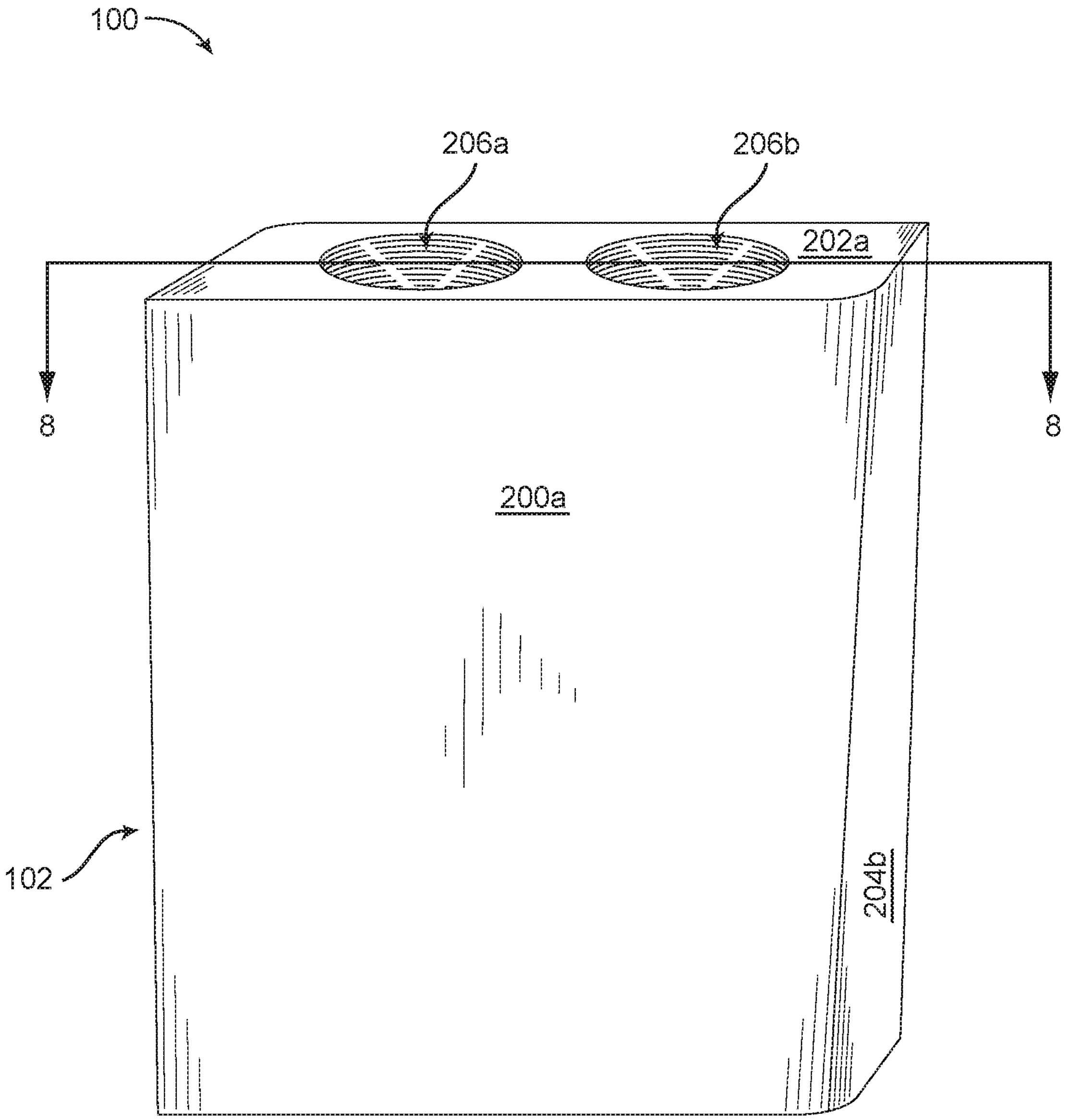
FIG. 7 illustrates a side view of an exemplary housing, in accordance with an embodiment of the present invention.
Figure 8:
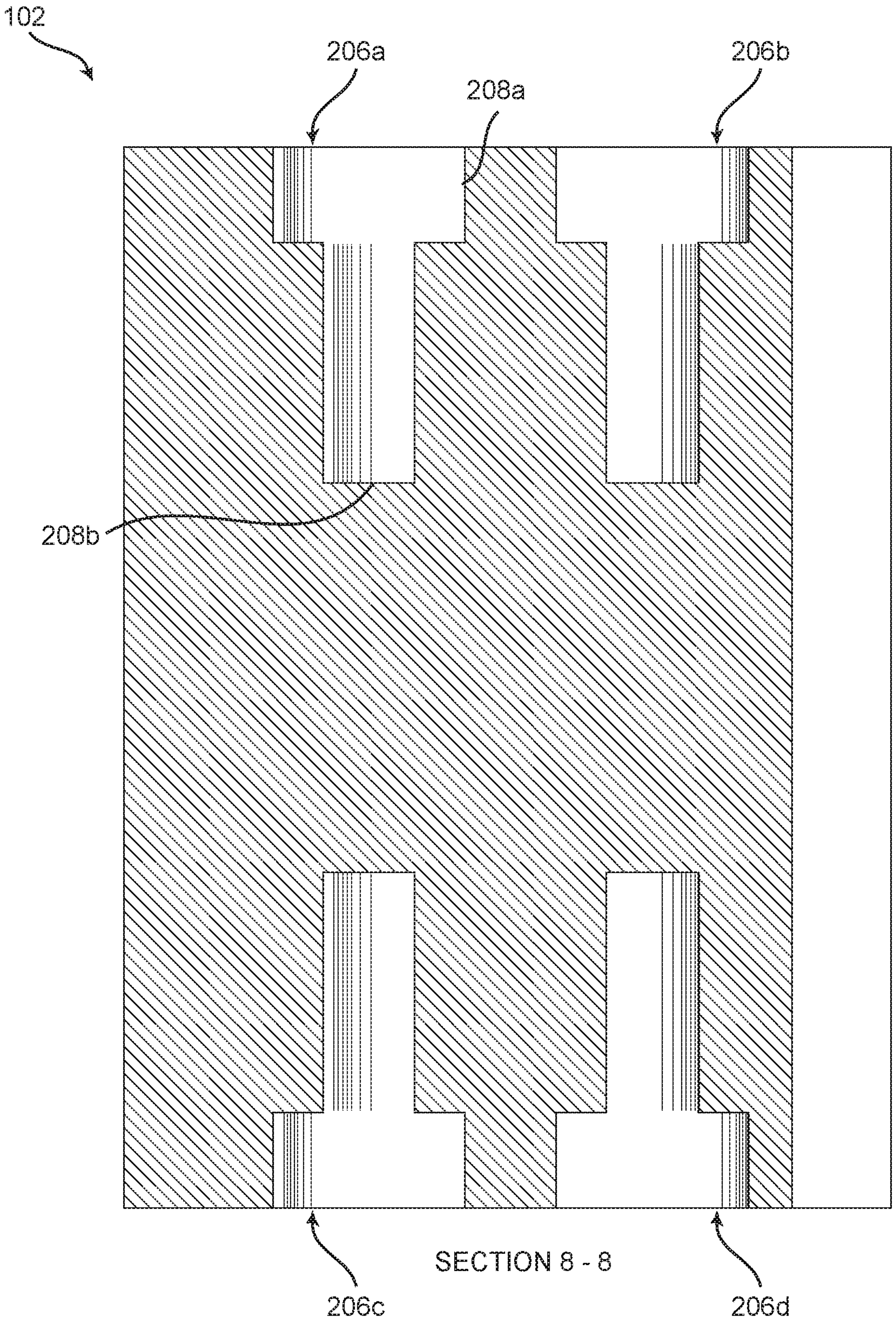
FIG. 8 illustrates a sectioned side view of the housing, the section taken along section 8-8 of FIG. 7, detailing the tapered cavities, in accordance with an embodiment of the present invention.

Turning now to FIG. 7, housing 102 is also defined by at least one cavity 206*a-b* having an outer region 208*a* and an inner region 208*b*. Cavity 206*a-b* is tapered and extends into at least one of the walls of the housing 102. As FIG. 8 illustrates, outer region 208*a* of cavity 206*a* is wide, while inner region 208*b* is narrow. This can be efficient shape for receiving a grommet 300*a*, 300*b*, described below. The tapered shape of cavity 206*a* is also efficacious for firmly securing the illumination mechanism 104*a-b* and/or the marking mechanism 900 into alignment for proper operation thereof. FIG. 8 also depicts an embodiment, where four cavities 206*a*, 206*b*, 206*c*, 206*d* are used, with two cavities formed on opposing edge walls 202*a*, 202*b*.

Figure 4:
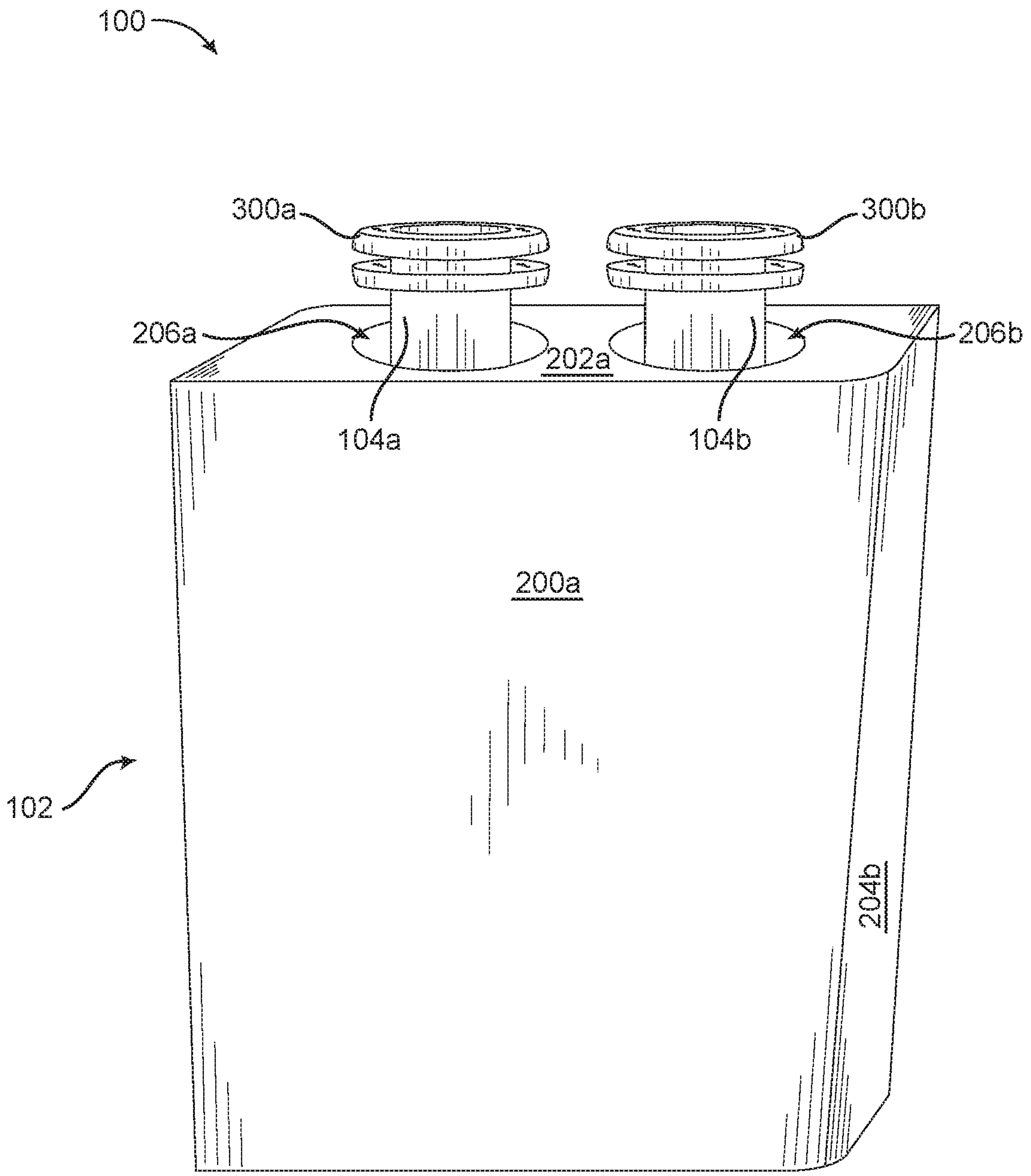
FIG. 4 illustrates a side view of the device, showing the light end of the illumination mechanism extended out of opening in cavity and one of the end walls, in accordance with an embodiment of the present invention.

As illustrated in FIG. 4, one of the edge walls 202*a-b*, 204*a-b* at the end of housing 102 forms the cavity 206*a-b*. Thus, cavity 206*a-b* may uniformly taper inwardly from the outer region 208*a* to the inner region 208*b*. Or cavity 206*a-b* may simply have a wide, cube-shaped outer region 208*a*, and a uniformly narrow inner region 208*b* extending therefrom. In any case, at least one cavity 206*a-b* forms into any of the side walls 200*a-b* or edge walls 202*a-b*, 204*a-b*, and has a generally wider outer region 208*a* than inner region 208*b*.

In one embodiment, the outer region 208*a* of the cavity 206*a-b* defined by a larger diameter than the inner region 208*b* of the cavity 206*a-b*. The outer region 208*a* orients towards the surface of the walls, and the inner region 208*b* oriented away from the surface of the walls. In one non-limiting embodiment, shown in FIG. 2, two cavities 206*a*, 206*b* form along one of the edge walls 202*a-b*, 204*a-b*. However, any combination of cavities along any of the edge walls 202*a-b*, 204*a-b* and/or side walls 200*a-b* may be possible. Such a two-cavity configuration can increase the amount of light being emitted from the walls of the housing 102.

Figure 3:
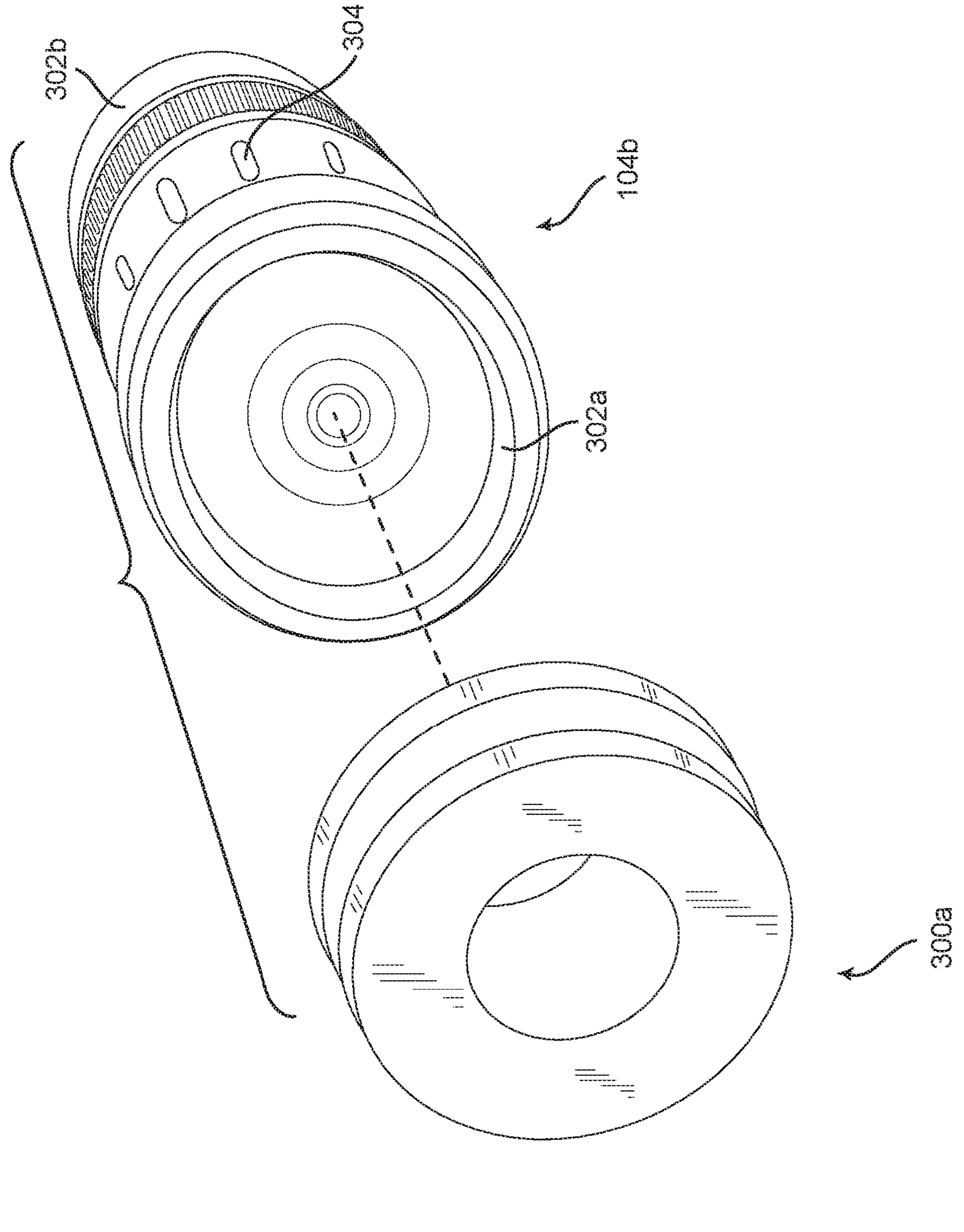
FIG. 3 illustrates an isometric view of an exemplary grommet aligned with an exemplary illumination mechanism, in accordance with an embodiment of the present invention.

Turning now to FIG. 3, device 100 comprises a grommet 300*a-b* disposed at the outer region 208*a* of the cavity 206*a-b*. Grommet 300*a-b* is disposed at the outer region 208*a* of the cavity 206*a-b*, and coplanar with the edge walls 202*a-b*, 204*a-b* of the housing 102. In some embodiments, grommet 300*a*, 300*b* may include a rubber member having a square, circular, triangular, or irregular shape that is sized and dimensioned to receive the light end 302*a* of the illumination mechanism 104*a-b* in a snug-fit relationship. In essence, the grommet 300*a-b* secures the illumination mechanism 104*a-b* in alignment with the cavity 206*a-b*. In one nonlimiting embodiment, two grommets 300*a*, 300*b* are used for retaining two illumination mechanisms 104*a*, 104*b*. Grommet may be fabricated from rubber or synthetic polymers.

Again, looking at FIG. 3, device 100 includes an illumination mechanism 104*a-b* that is removably fitted into at least one of the cavities. Illumination mechanism 104*a-b* has a light end 302*a* and a free end 302*b*. In one embodiment, free end 302*b* orients towards the inner region 208*b* of the cavity 206*a-b*, and light end 302*a* orients towards the outer region 208*a* of the cavity 206*a-b*. In this manner, the light end 302*a* can be removably fitted into the grommet 300*a*, 300*b*.

Figure 5:
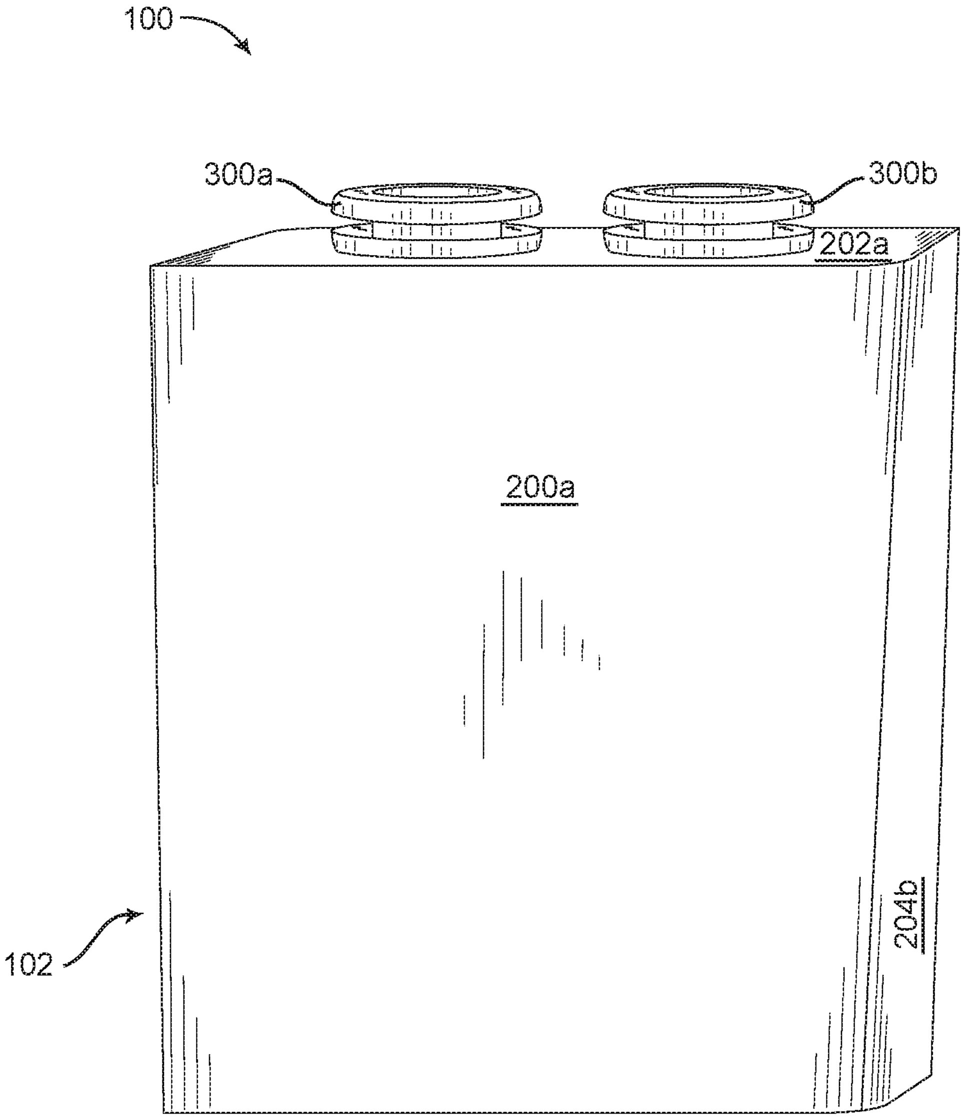
FIG. 5 illustrates a side view of the device, showing the grommet protruding from edge wall, in accordance with an embodiment of the present invention.
Figure 6:
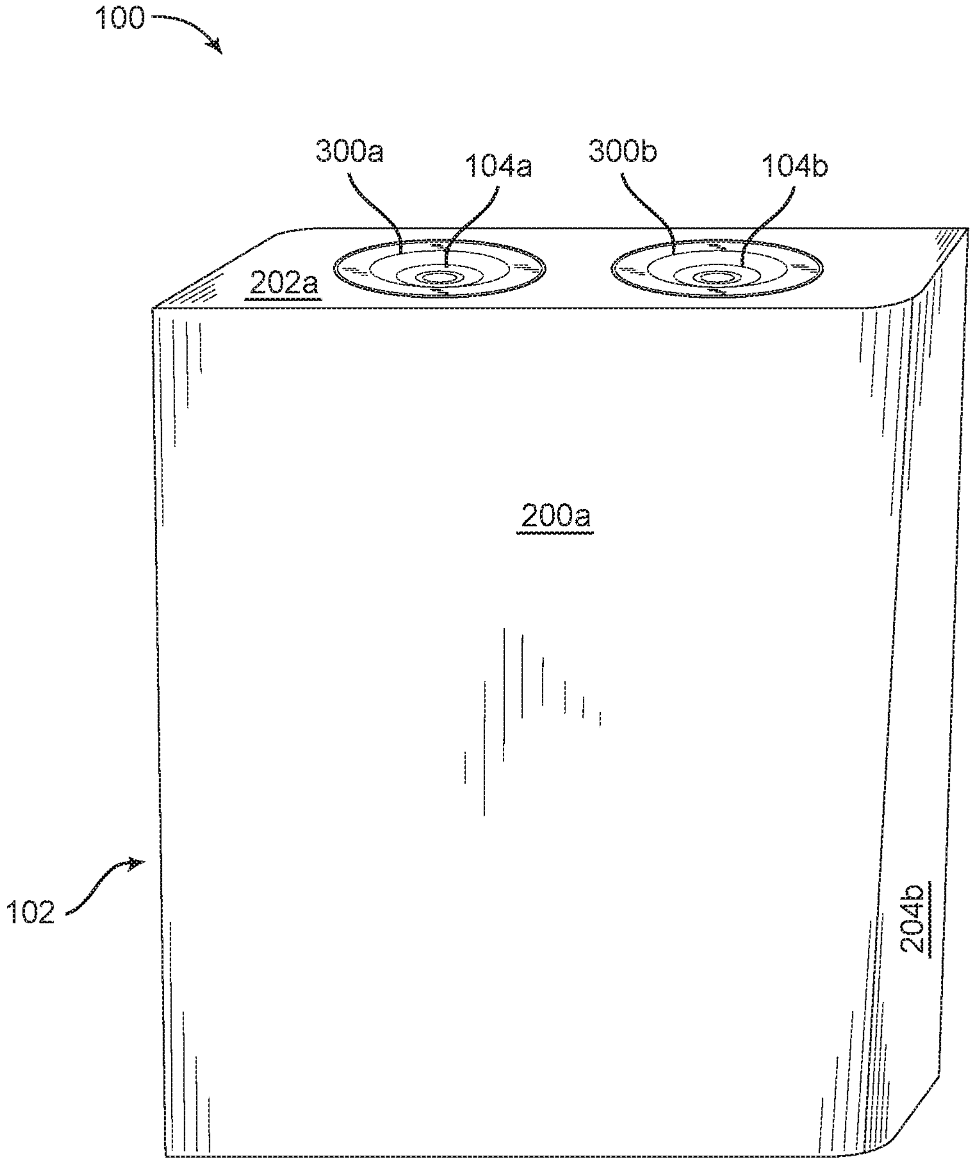
FIG. 6 illustrates a side view of the device, showing the illumination mechanism and grommet fully inserted and flush against edge wall, in accordance with an embodiment of the present invention.

Illumination mechanism 104*a-b* is easily introduced into any of the tapered cavities that may form along the side walls 200*a-b* and/or edge walls 202*a-b*, 204*a-b* in housing 102. For example, FIG. 4 illustrates light end 302*a* of illumination mechanism 104*a-b* extended out of opening in cavity 206*a-b* and one of the end walls. FIG. 5 shows grommet 300*a*, 300*b* protruding from edge wall. Finally, FIG. 6 shows illumination mechanism 104*a-b* and grommet 300*a*, 300*b* fully inserted and flush against edge wall 202*a-b*. As shown, the illumination mechanism 104*a-b* is shown to easily slide in and out of selected cavity 206*a-b*.

In some embodiments, light end 302*a* of illumination mechanism 104*a-b* selectively emits light. The light from illumination mechanism 104*a-b* can be powered on and off through a power switch 304 that is connected to a power source and a lamp at the light end 302*a*. In this manner, the light can be powered on during sanding operations with the housing 102. This allows an operator to shine light at a critical angle, so as to analyze the sanding that has been performed on the work surface 106. Illumination mechanism 104*a-b* may be powered by either a non-rechargeable or rechargeable battery. However, in alternative embodiments, an external power source may also be used.

In one non-limiting embodiment, illumination mechanism 104*a-b* comprises an elongated light emitting diode. Consequently, illumination mechanism 104*a-b* emits light outwardly from the walls of the housing 102 from one, or two opposing edge walls 202*a-b*, 204*a-b* (See FIG. 1). In addition, device 100 provides a marking mechanism that retracts and extends directly from at least one of the cavities along the walls.

Figure 9:
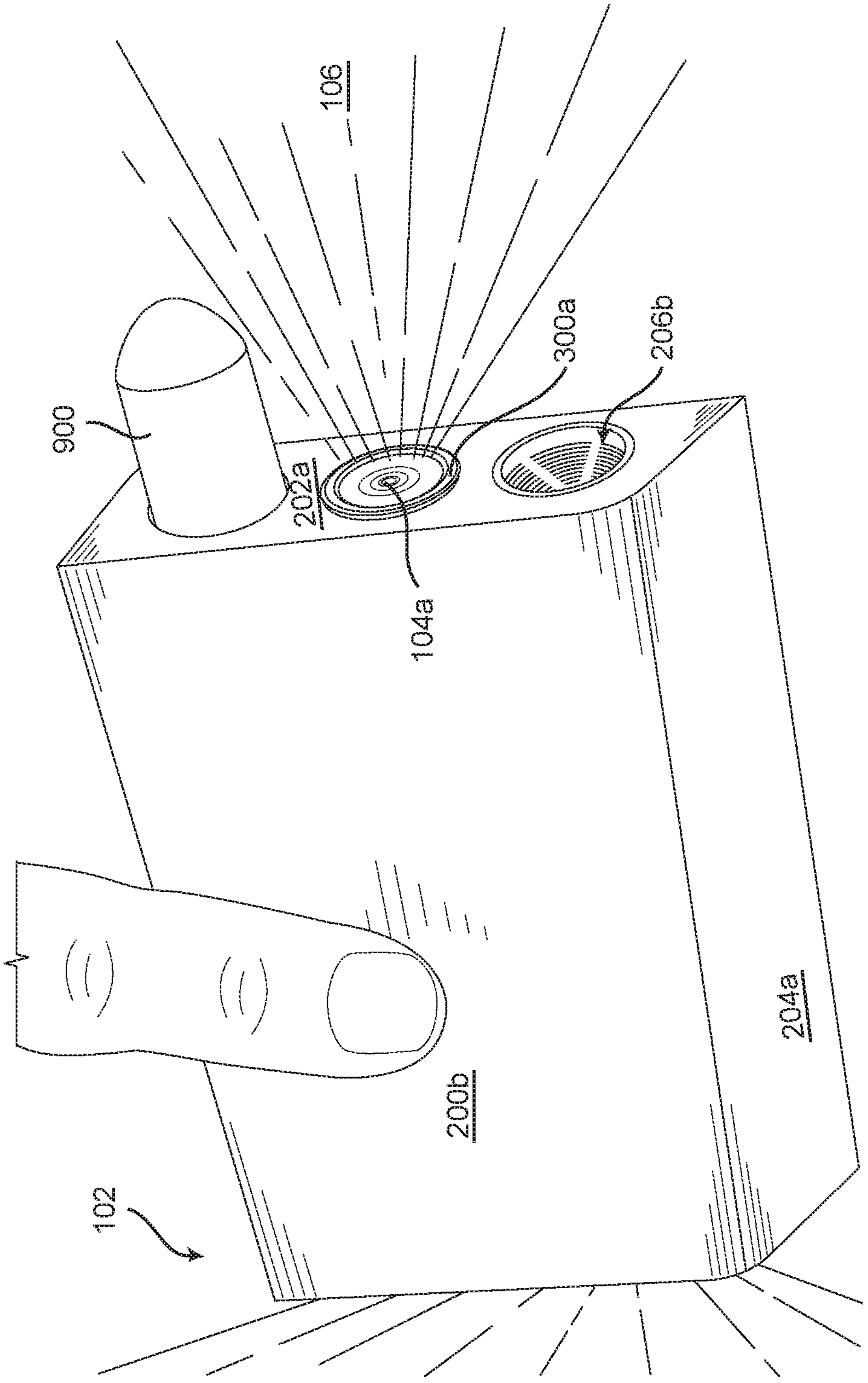
FIG. 9 illustrates a perspective view of an exemplary marking mechanism fitted into a cavity, adjacent to an illumination mechanism, in accordance with an embodiment of the present invention.

FIG. 9 illustrates a perspective view of an exemplary marking mechanism 900 fitted into a cavity 206*a-b*, adjacent to an illumination mechanism 104*a-b*. Marking mechanism may include a stick of chalk or a pencil used to mark the work surface 106. In some embodiments, marking mechanism is removably fitted into the cavity 206*a-b* and interchangeable with illumination mechanism 104*a-b*, or a different type of marking mechanism.

In some embodiments, marking mechanism 900 has a first end 1102 and a second end 1100. Second end 1100 is oriented towards the inner region 208*b* of the cavity 206*a-b*. First end 1102 orients towards the outer region 208*a* of the cavity 206*a-b*. Further, first end is removably fitted into the grommet 300*a*, 300*b*, forming a snug-fit relationship therewith. As explained above, first end is operable to mark a work surface 106, releasing chalk, graphite, or ink while being carried across the work surface 106. In this manner, marking mechanism is operable to mark the work surface 106 from the walls of the housing 102.

Figure 10:
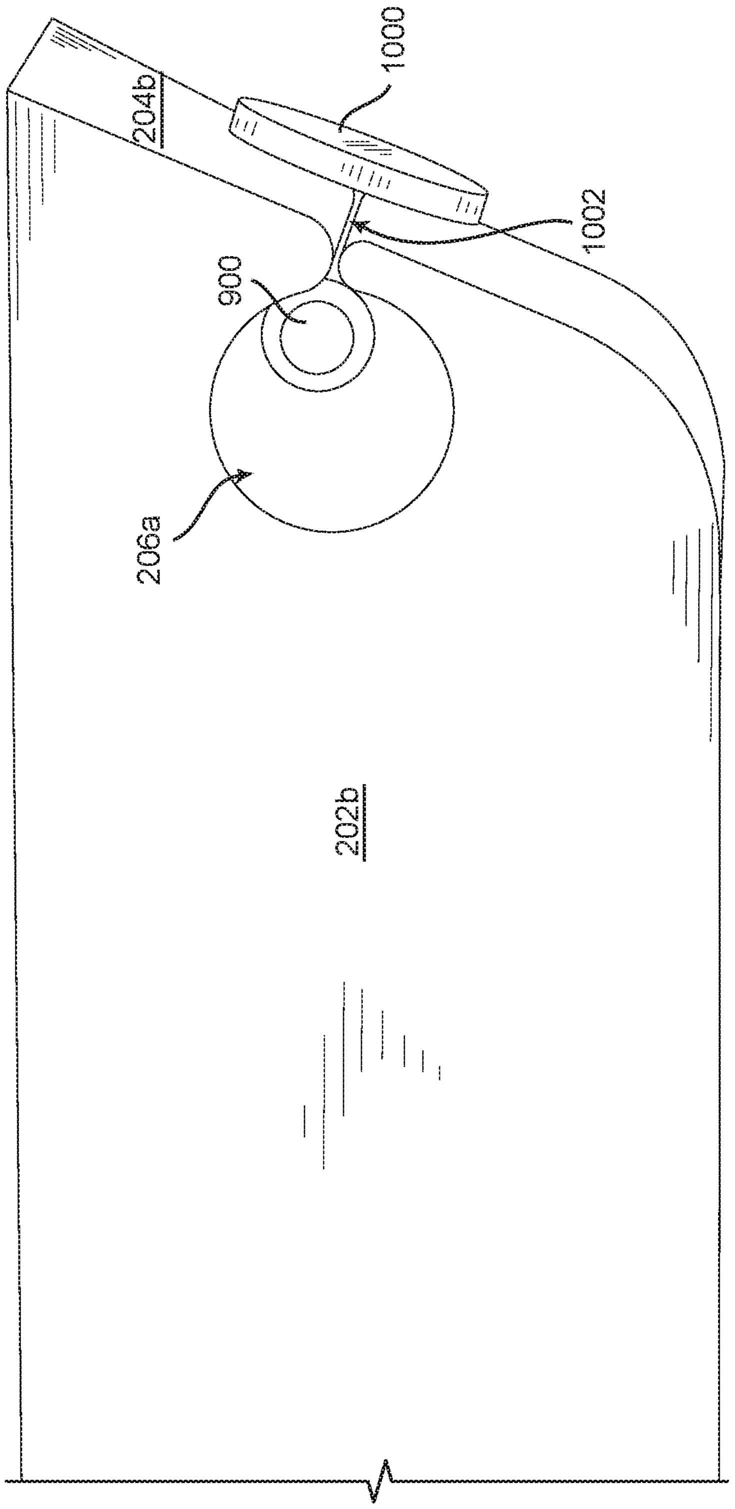
FIG. 10 illustrates a perspective view of an exemplary knob used with the marking mechanism, adjacent to an illumination mechanism, in accordance with an embodiment of the present invention.

In one alternative embodiment, marking mechanism 900 comprises a knob 1000 extending therefrom. FIG. 10 illustrates a perspective view of an exemplary knob 1000 used with the marking mechanism 900. Knob 1000 is configured to be operated by thumb, and slide along the length of a slot 1002 forming in the wall. Knob 1000 allows for easy manual retraction and extension of the marking mechanism relative to the cavity 206*a-b*. Thus, when in use, marking mechanism can be extended to mark the work surface 106; and when not in use, marking mechanism can be retracted into the cavity 206*a-b*, allowing the walls to remain flush for the sanding process.

Figure 11:
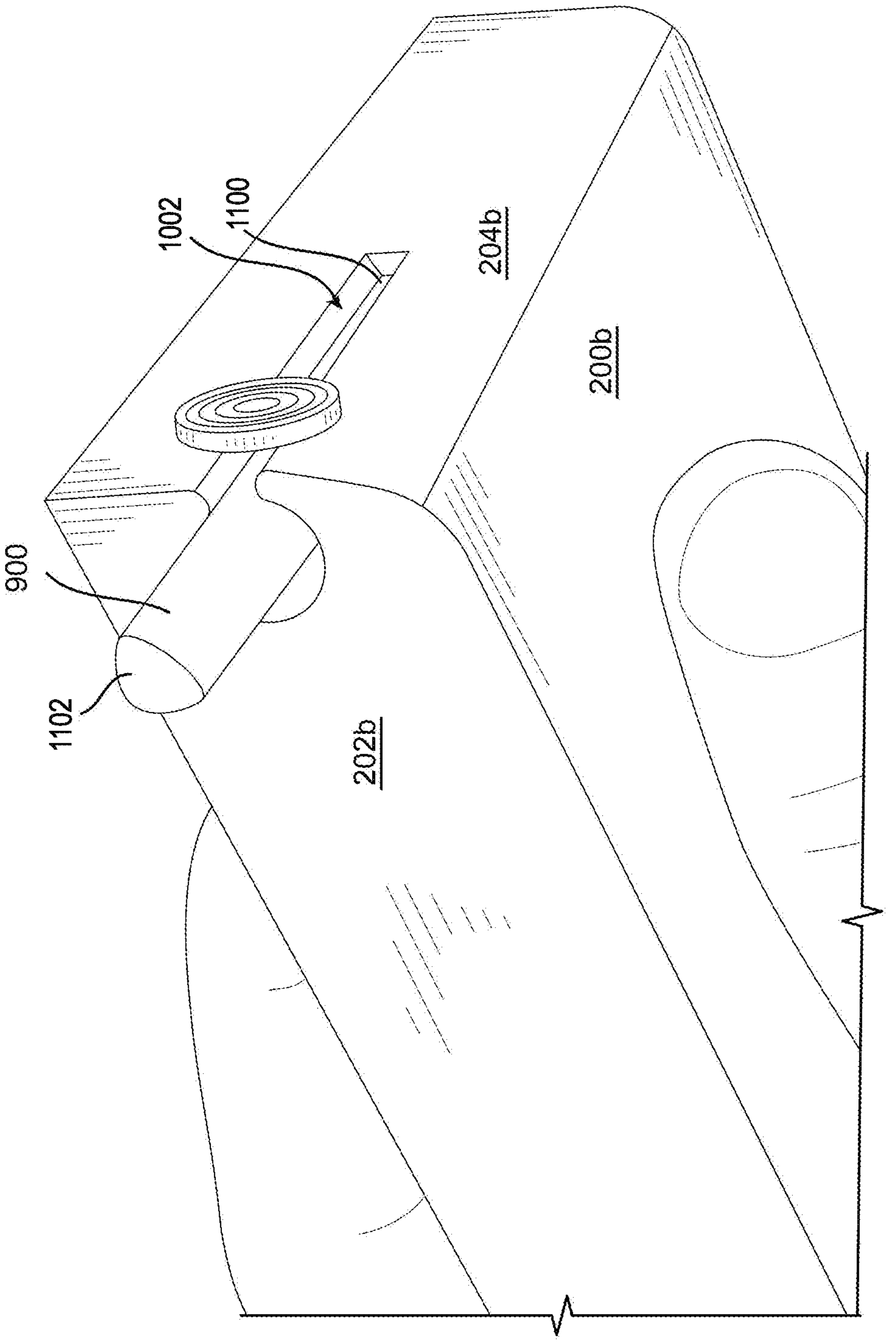
FIG. 11 illustrates an upper perspective view of an exemplary slot through which the knob slides for extension and retraction of the marking mechanism, in accordance with an embodiment of the present invention.
Figure 12:
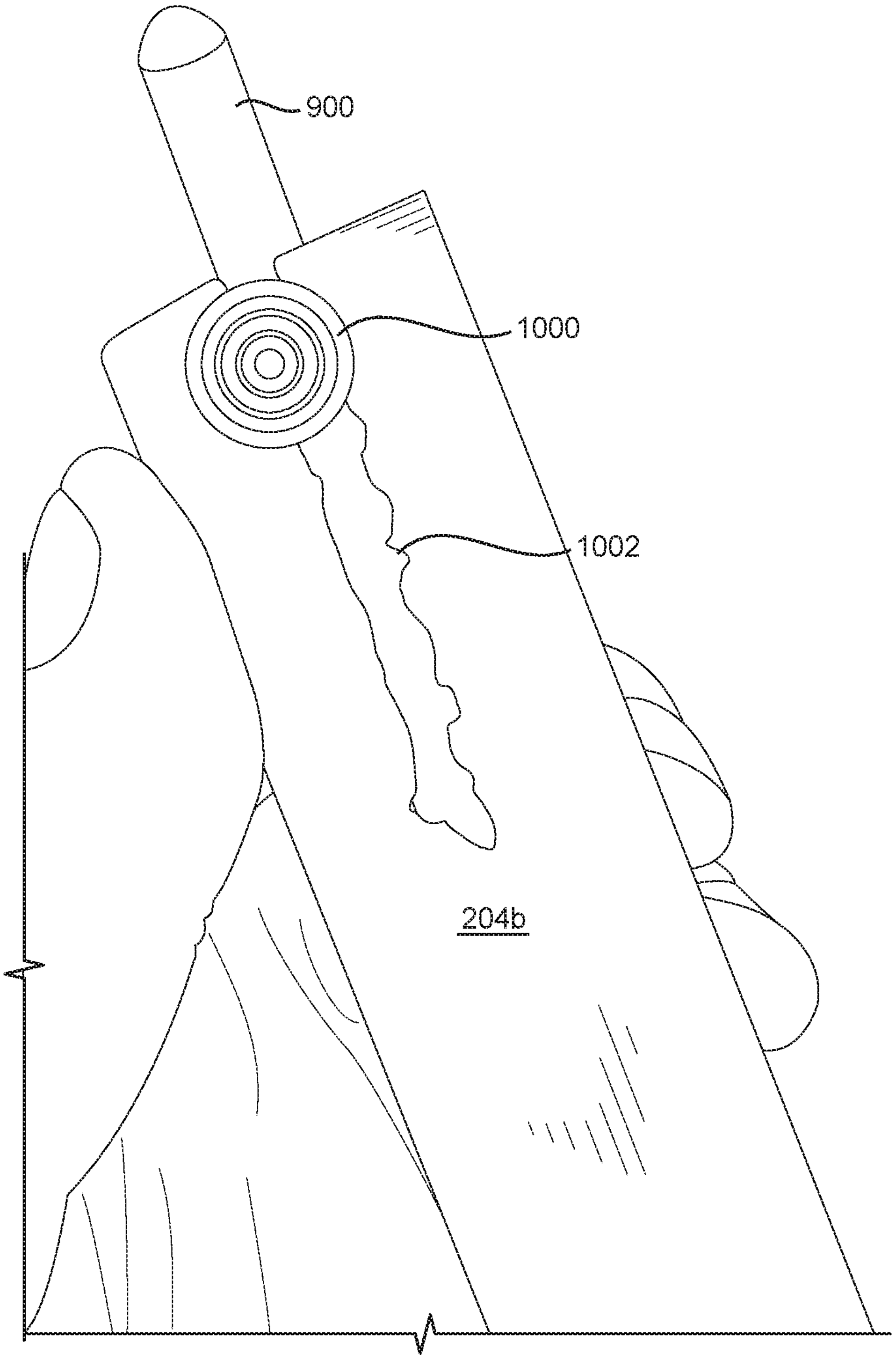
FIG. 12 illustrates a side perspective view of an exemplary slot through which the knob slides for extension and retraction of the marking mechanism, in accordance with an embodiment of the present invention.

For example, FIG. 11 and FIG. 12 illustrate an upper perspective view of slot 1002, through which knob 1000 slides for extension and retraction of the marking mechanism 900. Knob 1000 and slot 1002 may be disposed on any of edge walls 204*a*, 204*b*, so as to enable both left-handed and right-handed users to operate marking mechanism 900.

Figure 13:
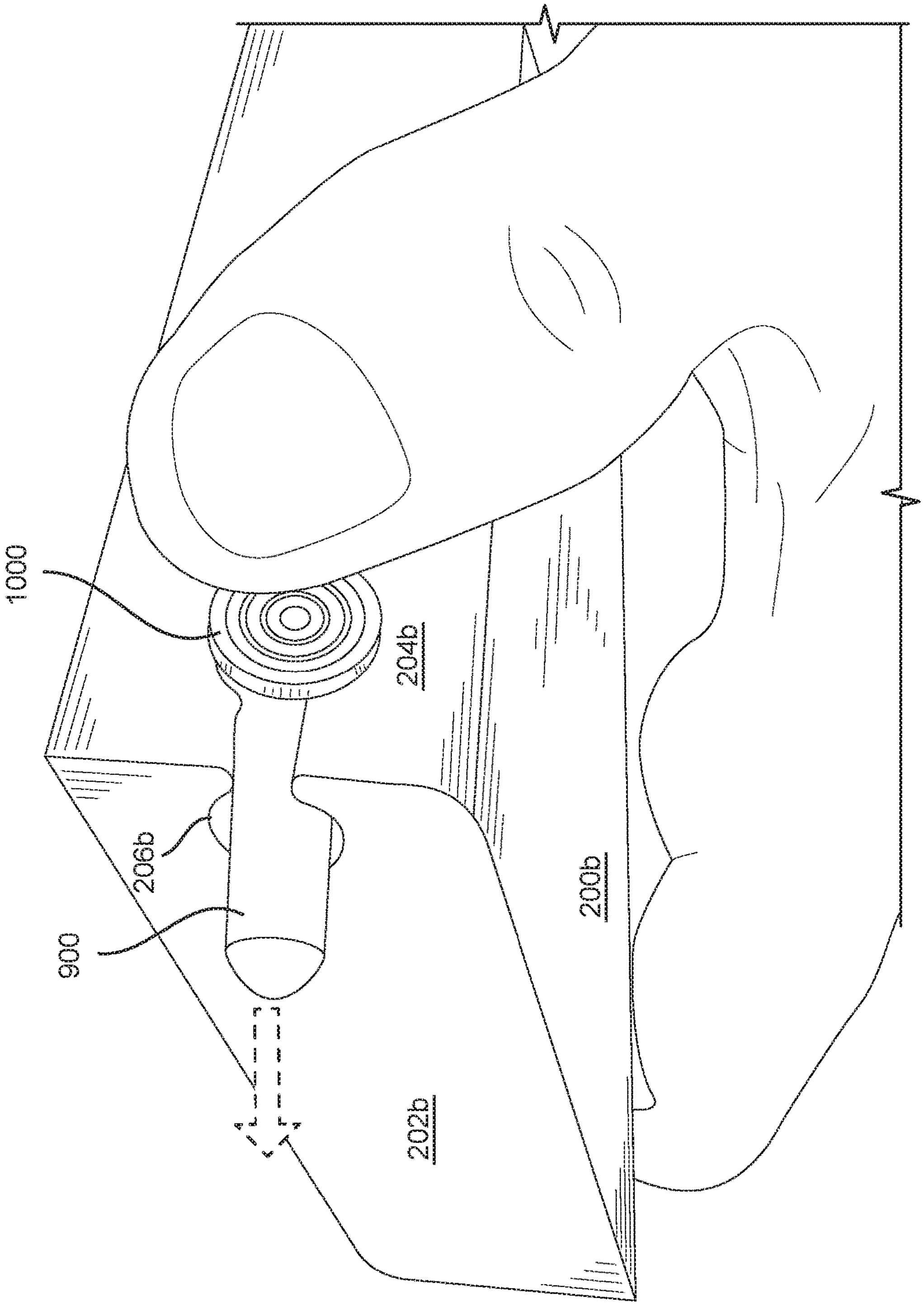
FIG. 13 illustrates a perspective view of the thumb manually sliding the knob towards the edge wall to extend the marking mechanism, in accordance with an embodiment of the present invention.
Figure 14:
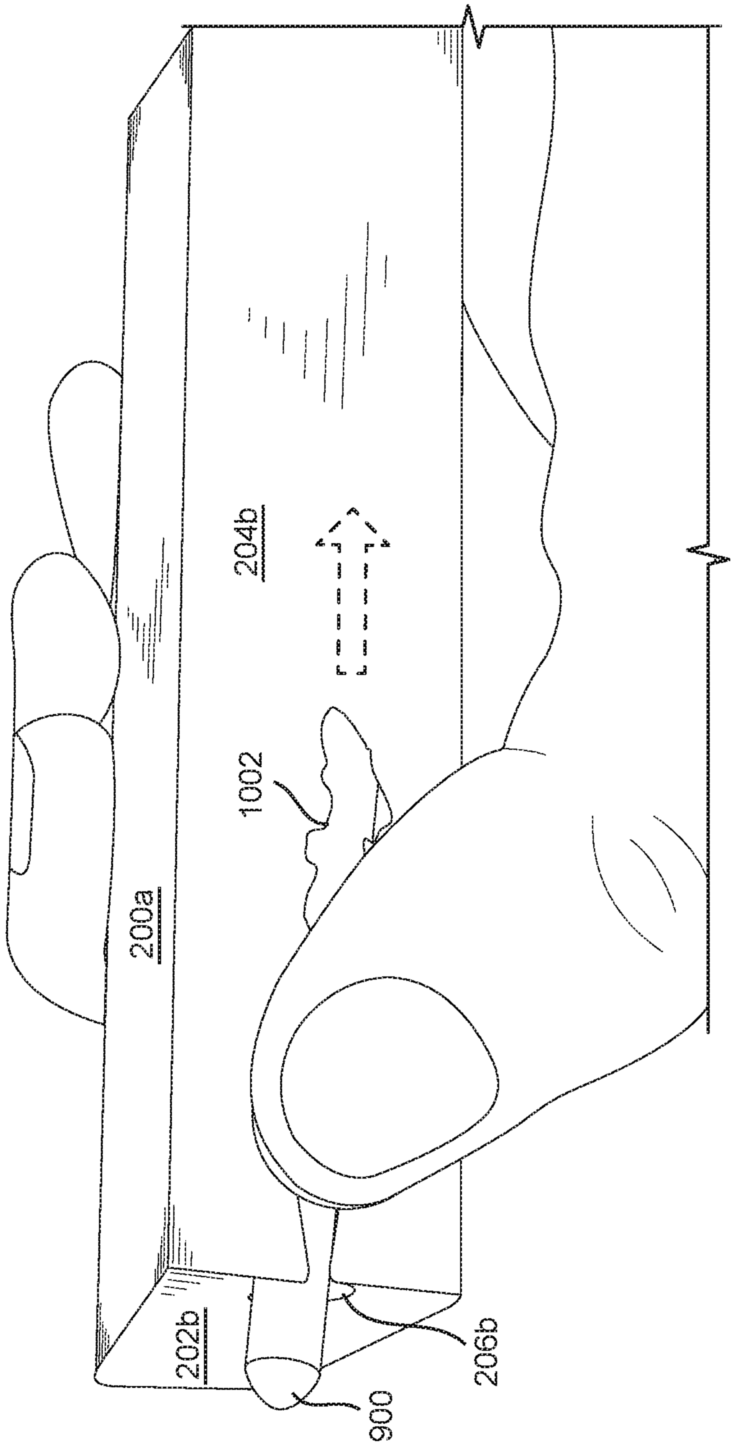
FIG. 14 illustrates a perspective view of the thumb manually sliding the knob away from the edge wall to retract the marking mechanism, in accordance with an embodiment of the present invention.

FIG. 13 illustrates a perspective view of the thumb manually sliding the knob 1000 towards the edge wall to extend the marking mechanism 900. Conversely, FIG. 14 illustrates a perspective view of the thumb manually sliding the knob 1000 away from the edge wall to retract the marking mechanism 900. The same sliding mechanism may be used with the illumination mechanism 104*a-b* discussed above. In such a configuration, a second knob 1000 may be attached to the illumination mechanism 104*a-b* to enable extraction and retraction thereof.

In operation, the side wall is pressed flush against the work surface 106. Work surface 106 may include a drywall or flooring requiring sanding. A hand, robot, or mechanical apparatus presses down on the housing 102 from the opposite side wall. The illumination mechanism 104*a-b* is powered on to shine light in front of the housing 102, so as to illuminate the work surface 106. Housing 102 may then be pressed back and forth against the work surface 106 to accomplish the sanding requirements. For example, FIG. 1 illustrates a perspective view of device 100 being used in a sanding operation of a work surface 106, while simultaneously illuminating the work surface 106. If a need to mark the work surface 106 arises, the marking mechanism 900 is extended from the respective cavity 206*a-b* to mark the surface, and then retracted so as to be flush with the edge wall after use.

In conclusion, illuminating drywall sponge device 100 provides a drywall sanding/scraping tool having tapered cavities that securely retain an illumination mechanism 104*a-b*, such that the work surface 106 being sanded is illuminated during sanding operations; and a marking mechanism for marking the illuminated work surface 106. The sponge light device 100 provides a housing 102 through which the sanding function is primarily performed.

Housing 102 has a block or rectangular shape, and walls with an abrasive material. The housing 102 also has multiple tapered cavities formed at the walls of the housing 102, oriented coplanar with the surface being sanded. Illumination mechanism 104*a-b* fits into the cavity 206*a-b*. The illumination mechanism 104*a-b* orients in the cavity 206*a-b* to throw light outwardly from the edge of the housing 102. Grommet 300*a*, 300*b* fits into the outer region 208*a* of the cavities to help stabilize and fasten illumination mechanism 104*a-b* in the cavities 206*a-b*. A retractable marking mechanism may also insert into the cavity 206*a-b*.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

I claim:

1. An illuminating drywall sponge system, comprising:

a housing defined by a plurality of walls including a pair of side walls and multiple edge walls, the housing further defined by a first cavity having a diameter and extending at least partially through the housing, the first cavity having an outer region comprising an opening coplanar with one of the walls and an inner region within extents of the housing, wherein the housing is monolithic; and an illumination mechanism having an illumination mechanism diameter selected based on the diameter such that the illumination mechanism is configured to removably fit within the first cavity when inserted through the opening, the illumination mechanism having a light end and a free end, the free end configured to be oriented towards the inner region when fit into the first cavity, the light end configured to be oriented towards the outer region when fit into the first cavity, the light end being operable to selectively emit light.

2. The illuminating drywall sponge system of claim 1, wherein the walls are arranged to form a parallelepiped shape.

3. The illuminating drywall sponge system of claim 1, wherein an outer surface of at least one of the walls comprises an abrasive material.

4. The illuminating drywall sponge system of claim 1, wherein an outer surface of at least one of the walls is encapsulated with a sandpaper.

5. The illuminating drywall sponge system of claim 1, wherein the multiple edge walls comprise four edge walls.

6. The illuminating drywall sponge system of claim 1, wherein the side walls have a larger surface area than the edge walls.

7. The illuminating drywall sponge system of claim 1, wherein the first cavity tapers inwardly from the outer region to the inner region.

8. The illuminating drywall sponge system of claim 1, further comprising a second cavity having a second diameter and extending at least partially through the housing, the second cavity having a second outer region comprising a second opening coplanar with one of the walls and a second inner region within the extents of the housing, wherein the first cavity and the second cavity are formed along one of the edge walls.

9. The illuminating drywall sponge system of claim 1, further comprising a grommet configured to be disposed at the outer region of the first cavity, wherein the illumination mechanism has the light end being configured to removably fit into the grommet.

10. The illuminating drywall sponge system of claim 9, wherein the grommet is defined by a square shape.

11. The illuminating drywall sponge system of claim 9, wherein the grommet is defined by a circular shape.

12. The illuminating drywall sponge system of claim 1, wherein the illumination mechanism comprises a power switch for powering on and off the light.

13. The illuminating drywall sponge system of claim 1, further comprising a marking mechanism.

14. The illuminating drywall sponge system of claim 8, wherein a marking mechanism having a marking mechanism diameter selected based on the second diameter such that the marking mechanism is configured to removably fit within the second cavity when inserted through the second opening, the marking mechanism having a first end and a second end, the second end configured to be oriented towards the second inner region of the second cavity, the first end configured to be oriented towards the second outer region of the second cavity, the first end being operable to mark a work surface when fit into the second cavity, whereby the marking mechanism is operatively arranged to mark the work surface from the walls of the housing when fit into the second cavity.

15. The illuminating drywall sponge system of claim 13, wherein the marking mechanism comprises a knob operatively arranged to enable retraction and extension of the marking mechanism relative to a second cavity of the housing.

16. The illuminating drywall sponge system of claim 13, wherein the marking mechanism comprises a stick of chalk or a pencil.

17. The illuminating drywall sponge system of claim 1, wherein the outer region is defined by a larger diameter than the inner region.

18. The illuminating drywall sponge system of claim 1, wherein the illumination mechanism further comprises:

a radially outward facing surface extending between the light end and the free end; and a power switch arranged on the radially outward facing surface, wherein the power switch can be activated within the housing.

19. An illuminating drywall sponge system, comprising:

a housing defined by a plurality of walls including a pair of side walls and multiple edge walls, the housing further defined by a first cavity having a diameter and extending at least partially through the housing, the first cavity having an outer region comprising an opening coplanar with one of the walls and an inner region within extents of the housing and a second cavity having a second diameter and extending at least partially through the housing, the second cavity having a second outer region comprising a second opening coplanar with one of the walls and a second inner region within the extents of the housing, wherein the housing is monolithic;

an illumination mechanism having an illumination mechanism diameter selected based on the diameter such that the illumination mechanism is configured to removably fit within the first cavity when inserted through the opening, the illumination mechanism having a light end and a free end, the free end configured to be oriented towards the inner region of the first cavity when fit into the first cavity, the light end configured to be oriented towards the outer region of the first cavity when fit into the first cavity, the light end being operatively arranged to selectively emit light; and a marking mechanism configured to removably fit within the second cavity of the housing, the marking mechanism having a first end and a second end, the second end configured to be oriented towards the inner region of the second cavity, the first end configured to be oriented towards the outer region of the second cavity, the first end being operatively arranged to mark a work surface when fit into the second cavity, whereby the marking mechanism is operatively arranged to mark the work surface from the walls of the housing when fit into the second cavity, the marking mechanism comprising a knob operatively arranged to enable retraction and extension of the marking mechanism relative to the second cavity when fit into the second cavity.

20. An illuminating drywall sponge system, comprising:

a housing defined by a plurality of walls including a pair of side walls and multiple edge walls, the housing further defined by a first cavity having a diameter and extending at least partially through the housing, the first cavity having an outer region comprising an opening coplanar with one of the walls and an inner region within extents of the housing and a second cavity having a second diameter and extending at least partially through the housing, the second cavity having a second outer region comprising a second opening coplanar with one of the walls and a second inner region within the extents of the housing, wherein the housing is monolithic;

an illumination mechanism having an illumination mechanism diameter selected based on the diameter such that the illumination mechanism is configured to removably fit within the first cavity when inserted through the opening, the illumination mechanism having a light end and a free end, the free end configured to be oriented towards the inner region of the first cavity when fit into the first cavity, the light end configured to be oriented towards the outer region of the first cavity when fit into the first cavity, the light end being operatively arranged to selectively emit light; and a marking mechanism configured to removably fit within the second cavity of the housing, the marking mechanism having a first end and a second end, the second end configured to be oriented towards the second inner region of the second cavity, the first end configured to be oriented towards the second outer region of the second cavity, the first end configured to be operatively arranged to mark a work surface, whereby the marking mechanism is operatively arranged to mark the work surface from the walls of the housing when fit into the second cavity, the marking mechanism comprising a knob operatively arranged to enable retraction and extension of the marking mechanism relative to the second cavity, the marking mechanism comprising a stick of chalk.

* * * * *